(12) United States Patent
Chen

(10) Patent No.: US 12,351,226 B2
(45) Date of Patent: Jul. 8, 2025

(54) TRANSFER TROLLEY AND OUTDOOR TRANSFER DEVICE

(71) Applicant: Yuwen Chen, Guangdong (CN)

(72) Inventor: Yuwen Chen, Guangdong (CN)

( * ) Notice: Subject to any disclaimer, the term of this patent is extended or adjusted under 35 U.S.C. 154(b) by 0 days.

(21) Appl. No.: 18/829,259

(22) Filed: Sep. 9, 2024

(65) Prior Publication Data

US 2025/0091629 A1 Mar. 20, 2025

(30) Foreign Application Priority Data

Sep. 20, 2023 (CN) .......................... 202322557102.0

(51) Int. Cl.
*B62B 3/02* (2006.01)
*B62B 5/06* (2006.01)

(52) U.S. Cl.
CPC .............. *B62B 3/022* (2013.01); *B62B 5/066* (2013.01); *B62B 5/067* (2013.01)

(58) Field of Classification Search
CPC ........... B62B 3/022; B62B 3/02; B62B 3/025; B62B 3/027; B62B 5/066; B62B 5/067; B62B 5/06

See application file for complete search history.

(56) References Cited

U.S. PATENT DOCUMENTS

| | | | | |
|---|---|---|---|---|
| 7,097,182 | B1* | 8/2006 | Liu ........................... | B62B 3/02 |
| | | | | 280/42 |
| 10,376,030 | B1* | 8/2019 | Koh ......................... | B62B 3/02 |
| 10,836,418 | B2* | 11/2020 | Zhu ......................... | B62B 3/025 |
| 11,958,520 | B1* | 4/2024 | Sun ......................... | B62B 5/067 |
| 2023/0001973 | A1* | 1/2023 | Frankel ................... | B62B 3/003 |

* cited by examiner

*Primary Examiner* — John D Walters

(57) ABSTRACT

A transfer trolley and an outdoor transfer device are disclosed. The transfer trolley includes a frame, casters, a drag rod, and constraint components. The frame has a structure of being folded or unfolded in a width direction, the casters are two pairs and fixed to bottom of the frame. One end of the drag rod being rotary fixed to one end in a length direction of the frame, and the other end of the drag rod being flipped upwardly or downwardly around the one end of the drag rod that is rotationally connected with the frame. The constraint components are fixed to and cooperating with the frame to allow the frame in a locked state of keeping unfolded or an unlocked state of being folded in the width direction. By intelligently designing the frame into a foldable structure, greatly reducing the space required for storage of the transfer trolley.

8 Claims, 11 Drawing Sheets

TRANSFER TROLLEY AND OUTDOOR TRANSFER DEVICE

TECHNICAL FIELD

The present application relates to the technical field of transfer devices, and in particular to a transfer trolley and an outdoor transfer device.

BACKGROUND

As an important auxiliary tool for indoor and outdoor goods transfer, the transfer trolley may provide users with labor-saving, time-saving and efficient transfer assistance in the transfer of heavy objects and multiple objects. While for general daily use, people need to transfer goods with the help of the transfer trolley is not very frequent. Therefore, how to improve the portability and storage compactness of the transfer trolley is a positive practical significance of the topic.

Although in related technologies there are some products that may reduce the vertical space occupation of the transfer trolley by folding the drag rod, due to the fact that the transfer trolley itself occupies a larger space in the structure of the frame, there is still a certain amount of space and expectation for improvement in just folding the drag rod to improve the convenience of storage and reduce the vertical space occupation, especially when some users place the transfer trolley in the trunk of a car or other storage areas with less space. If the frame may be further structural modification, so that it may be maintain a better transfer volume of goods when in use, and meanwhile also may further reduced the space occupation when in storage, then it will provide a more humane and convenient effect on the application of the transfer trolley.

SUMMARY

In view of above, the present disclosure aims to provide a transfer trolley and an outdoor transfer device that are flexible in use, convenient in folding, and take up little space when storing.

To achieve above objectives, the present disclosure adopts the following technical solutions. In a first aspect, in some embodiments of the present disclosure, a transfer trolley is provided, including:

a frame, having a structure of being folded or unfolded in a width direction;

casters, fixed to bottom of the frame;

a drag rod, one end of the drag rod being rotary fixed to middle of one end in a length direction of the frame, and the other end of the drag rod being flipped upwardly or downwardly around the one end of the drag rod that is rotationally connected with the frame; and constraint components, fixed to and cooperating with the frame to allow the frame in a locked state of keeping unfolded or an unlocked state of being folded in the width direction.

As some optional embodiments of the present disclosure, preferably, the frame includes:

a pair of bracing pieces, arranged opposite each other, where the casters are two pairs and two casters opposite each other are fixed to lower parts of both ends of the bracing pieces; and connective components, connected to the bracing pieces and capable of moving the bracing pieces to allow the frame be folded or unfolded in the width direction.

Herein one end of the bracing pieces is rotary connected to one end of the connective components or one of the bracing pieces, the constraint components are connected with the bracing pieces and cooperate with the connective components to allow the frame in the locked state of keeping unfolded or the unlocked state of being folded in the width direction.

As some optional embodiments of the present disclosure, preferably, the pair of bracing pieces extend horizontally and are arranged parallel to each other or crosswise, and in case of the bracing pieces are arranged crosswise, middle of the bracing pieces is connected by a connecting shaft in a scissor rotation, and the connective components includes, a pair of first traction rods, corresponding with the bracing pieces one to one, where one end of the first traction rods is rotary connected with one end of the bracing pieces; and a connecting base, provided between the pair of the first traction rods, where the other end of the first traction rods is rotary connected with the connecting base.

Herein the one end of the drag rod is connected with the connecting base by means of a rotor, and the other end of the drag rod is flipped upwardly or downwardly around the one end of the drag rod that is rotationally connected with the connecting base.

As some optional embodiments of the present disclosure, preferably, the pair of the bracing pieces extends horizontally and is arranged parallel to each other, and the connective components includes, a pair of connecting rods, with a middle thereon being connected in the scissor rotation, where the connecting rods are disposed between the bracing pieces, one end of the connecting rods is rotationally connected to the other end of the bracing pieces, and the other end of the connecting rods is relatively movably connected to a portion between both ends of the bracing pieces by means of a connector, respectively.

Herein the constraint components is configured to cooperate with the connective components in the unlocked state, and in case of the bracing pieces on the frame are moved in a similar or dissimilar direction, the other end of the connecting rods is moved relative to the bracing pieces to allow the frame to be folded or unfolded in the width direction.

As some optional embodiments of the present disclosure, preferably, the connective components further include coupling sleeves, with the number of the coupling sleeves corresponding to the number of the bracing pieces, the coupling sleeves are slidably sleeved on the bracing pieces along the length direction of the bracing pieces, and the other end of the connecting rods are rotatably connected with the coupling sleeves by a rotating connector.

As some optional embodiments of the present disclosure, preferably, the connective components further include sliding guides, with the number of the sliding guides corresponding to the number of the bracing pieces, and the sliding guides are secured between both ends of the bracing pieces, the other end of the connecting rods is relatively slidably connected with the sliding guides by means of a sliding connector.

As some optional embodiments of the present disclosure, preferably, the constraint components include locating parts, with the number of the locating part corresponding to the number of the bracing pieces, and the locating parts are secured on one end of the bracing pieces. And locating part is configured to limit an amplitude of rotation of the other end of the first traction rods in a direction away from the other end of the bracing pieces to a preset value, in case of the other end of the first traction rods is rotated in the direction away from the other end of the bracing pieces to allow the first traction rods abut against the locating part, the magnitude of unfolding of the frame to be performed in the width direction is unidirectional locked.

Herein the first traction rods have one of the following configurations or positional relationships with the locating part.

(1) A portion of the first traction rods in proximity to the locating part is provided with an avoidance structure, and the avoidance structure is configured to allow one end of the first traction rods does not interfere in motion with the locating part in case of the other end of the first traction rods is rotated in a direction proximate to the other end of the bracing pieces.

(2) The first traction rods form a preset spacing from one end of the locating part, in case of the other end of the first traction rods is rotated in a direction close to the other end of the bracing pieces, a virtual motion trajectory of the first traction rods does not cover a layout position of the locating part; but in case of the other end of the first traction rods is rotated in a direction away from the other end of the bracing pieces, the layout position of the locating part is located on the virtual motion trajectory of the first traction rods.

As some optional embodiments of the present disclosure, preferably, the connective components further include, a second traction rod, disposed between and parallel to the pair of the bracing pieces, where one end of the second traction rod extending between the pair of the first traction rods, the connecting base is provided in one pair and the pair of connecting bases are connected opposite to both sides of one end of the second traction rod, and the pair of connecting base are rotationally connected to the other end of the first traction rods; and two pairs of third traction rods, each pair oppositely disposed at the other end and middle of the second traction rod respectively, where one end of the third traction rods is rotationally connected with the second traction rod, and the other end of the third traction rods is rotationally connected with the bracing pieces in close proximity thereto.

Herein constraint component includes, at least one pair of connecting posts, relatively connected to the first traction rods and/or the third traction rods located between ends of the pair of the bracing pieces; and at least one pair of constraint rods, relatively connected to one end and/or the other end of the bracing pieces, where one end of the constraint rods is rotationally connected to one end or the other end of the bracing pieces, and the other end of the constraint rods is provided with connecting hooks, the connecting hooks is configured to removably fit with the connecting posts on the first traction rods or the third traction rods, to allow the frame has the locked state of keeping unfolded or the unlocked state of being folded in the width direction.

As some optional embodiments of the present disclosure, preferably, the bracing pieces include, a pair of first bracing pieces, horizontally arranged and parallel to each other; and a pair of second bracing pieces, corresponding to the first bracing pieces and one end of the second bracing pieces is slidably sleeved on one end of the first bracing pieces.

Herein the first connecting rods are one-to-one with the second bracing pieces, and one end of the first traction rods is rotationally connected to the other end of the second bracing pieces.

Herein one end of the first connecting rods is rotationally connected to the other end of the first bracing pieces, and the other end of the first connecting rods is rotationally connected to the other end of the second bracing pieces via the connector.

Moreover, herein the constraint components include a pair of limited rods, the locating part is secured to the other end of the second bracing pieces, and the limited rods is configured to limit the amplitude of rotation of the other end of the first traction rods in a direction away from the other end of the second bracing pieces to a preset value, in case of the other end of the first traction rods is rotated in the direction away from the other end of the second bracing pieces to allow the first traction rods abut against the locating part, the amplitude unfolding of the frame to be performed in the width direction is unidirectional locked.

Herein the first traction rods have the following configurations or positional relationships with the limited rods.

(1) A portion of the first traction rods in proximity to the limited rods is provided with the avoidance structure, the avoidance structure is configured to allow one end of the first traction rods does not interfere in motion with the limited rods in case of the other end of the first traction rods is rotated in a direction proximate to the other end of the second bracing pieces.

(2) The first traction rods form the preset spacing from one end of the limited rod, and in case of the other end of the first traction rods is rotated in a direction close to the other end of the second bracing pieces, the virtual motion trajectory of the first traction rods docs not cover a layout position of the limited rods, but in case of the other end of the first traction rods is rotated in a direction away from the second bracing pieces, the layout position of the limited rods is located on the virtual motion trajectory.

In a second aspect, in some embodiments of the present disclosure, an outdoor transfer device is provided, including the transfer trolley described above.

Herein the casters are universal or unidirectional wheels.

Herein the drag rod includes a first drag rod and a second drag rod, one end of the first drag rod is connected with the connecting base via the rotor, and one end of the second drag rod is slidably connected in parallel to the other end of the first drag rod. An anti-detachment structure is provided between of the one end of the second drag rod and the other end of the first drag rod to prevent the first drag rod and the second drag rod from separating. The other end of the second drag rod is flipped upwardly or downwardly around the one end of the first drag rod is rotationally connected with the connecting base.

By adopting the technical solutions described above, the transfer trolley and the outdoor transfer device of the present disclosure has the following beneficial effects and advantages.

By intelligently designing the frame into a foldable structure, and meanwhile the drag rod is also designed into a structure that can be rotated with the frame, so that when the transfer trolley needs to be used, it can be simply and conveniently unfolded and locked by means of the constraint components and the frame to realize the unidirectional unfolding. And when the transfer trolley not in need, not only can the frame be folded, but the drag rod can also be further flipped and folded, thereby greatly reducing the space required for storage of the transfer trolley.

BRIEF DESCRIPTION OF THE DRAWINGS

To more clearly illustrate the technical solutions in the embodiments of the present disclosure or the existing technologies, the following will briefly introduce the accompanying drawings that need to be used in the description of the embodiments. It is obvious that the accompanying drawings in the following description are only some of the embodiments of the present disclosure, and for the person of ordinary skill in the art, other drawings can be obtained according to these drawings without creative labor.

DETAILED DESCRIPTION OF THE EMBODIMENTS

Figure 1:
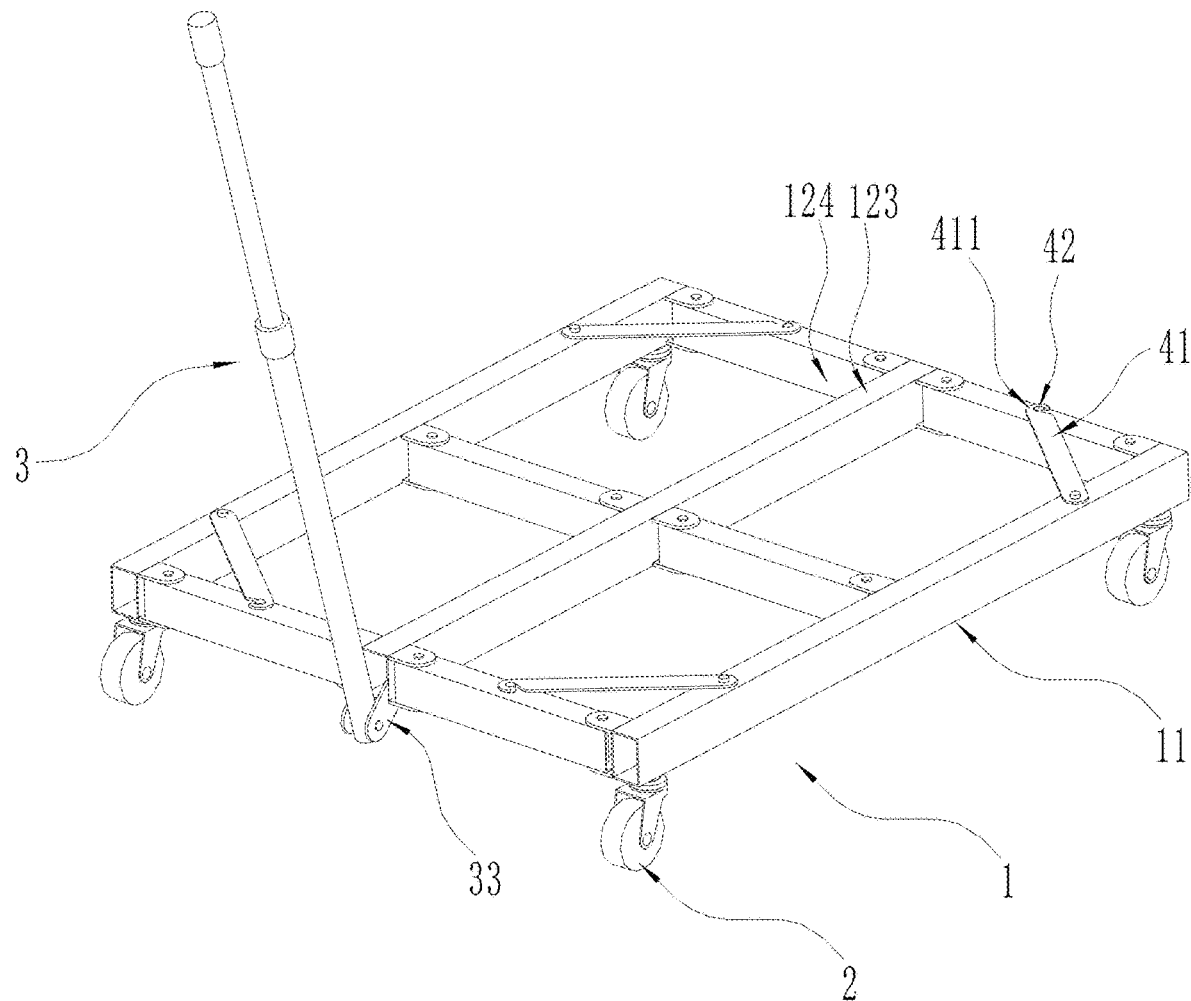
FIG. 1 shows a schematic diagram of a briefly implemented structure of a transfer trolley in accordance with Embodiment 1 of the present disclosure, illustrating that a frame of the transfer trolley in an unfolded state, and constraint components fit with the frame to lock it in the unfolded state.

The technical solutions of the present disclosure will be described in further detail below in connection with the accompanying drawings and embodiments. In particular, it is noted that the following embodiments are only intended to illustrate the transfer trolley and the outdoor transfer device of the present disclosure, but not to limit the scope of the protection of the present invention. Similarly, the following embodiments are only some but not all of the embodiments of the present disclosure, and all other embodiments obtained by the person of ordinary skill in the art without creative labor shall fall within the scope of protection of the present invention.

Embodiment 1

Referring to FIG. 1 to FIG. 5, in the embodiments of the present disclosure, a transfer trolley is provided, including:
a frame 1, having a structure of being folded or unfolded in a width direction;
casters 2, fixed to bottom of the frame 1;
a drag rod 3, one end of the drag rod 3 being rotary fixed to middle of one end in a length direction of the frame 1, and the other end of the drag rod 3 being flipped upwardly or downwardly around the one end of the drag rod 3 that is rotationally connected with the frame 1; and
constraint components 4, fixed to and cooperating with the frame 1 to allow the frame 1 in a locked state of keeping unfolded or an unlocked state of being folded in the width direction.

In the embodiments of the present disclosure, the length direction is a direction parallel to a traveling direction of the transfer trolley, and the width direction is perpendicular to the length direction and a height direction.

In the embodiments of the present disclosure, the frame 1 includes, a pair of bracing pieces 11, arranged opposite each other, where the casters 2 are two pairs and two casters 2 opposite each other are fixed to lower parts of both ends of the bracing pieces 11; and connective components 12, connected to the bracing pieces 11 and capable of moving the bracing pieces 11 to fold or unfold the frame 1 along the width direction.

Herein one end of the bracing pieces 11 is rotary connected to one end of the connective components 12, the constraint components 4 are connected with the bracing pieces 11 and cooperate with the connective components 12 to allow the frame 1 in the locked state of keeping unfolded or the unlocked state of being folded in the width direction.

Moreover, as an example of one of the optional implementations of casters, the casters 2 has two pairs and are fixed opposite each other at the bottom of the frame 1.

In the embodiments of the present disclosure, the pair of bracing pieces 11 extend horizontally and are arranged parallel to each other, and the connective components 12 includes, a pair of first traction rods 121, corresponding with the bracing pieces 11 one to one, where one end of the first traction rods 121 is rotary connected with one end of the bracing pieces 11;

a connecting base 122, provided between the pair of the first traction rods 121, where the other end of the first traction rods 121 is rotary connected with the connecting base 122;

a second traction rod 123, disposed between and parallel to the pair of the bracing pieces 11, where one end of the second traction rod 123 extending between the pair of the first traction rods 121, the connecting base 122 is provided in one pair and the pair of connecting bases 122 are connected opposite to both sides of one end of the second traction rod 123, and the pair of the connecting bases 122 are rotationally connected to the other end of the first traction rods 121; and two pairs of third traction rods 124, each pair oppositely disposed at the other end and middle of the second traction rod 123 respectively, where one end of the third traction rods 124 is rotationally connected with the second traction rod 123, and the other end of the third traction rods 124 is rotationally connected with the bracing pieces 11 in close proximity thereto.

Based on the above configurations, in the embodiments of the present disclosure, the constraint components 4 include:

at least one pair of connecting posts 42, relatively connected to the first traction rods 121 and the third traction rods 124 located between ends of the bracing pieces 11;

at least one pair of constraint rods 41, relatively connected to one end and the other end of the bracing pieces 11, where one end of the constraint rods 41 is rotationally connected to one end or the other end of the bracing pieces 11, and the other end of the constraint rods 41 is provided with connecting hooks 411, the connecting hooks 411 is configured to removably fit with the connecting posts 42 on the first traction rods 121 or the third traction rods 124, to allow the frame 1 has the locked state of keeping unfolded or the unlocked state of being folded in the width direction.

In the embodiments of the present disclosure, in addition to the above mentioned implementation forms of the constraint components 4, the connecting posts 42 may also be provided only on the first traction rods 121 or on the third traction rods 124, accordingly the constraint rods 41 are connected to one end or the other end of the bracing pieces 11, which corresponds to the connecting posts 42. Adopting this form will make the structural strength of the locked state of unilateral frame not high, it is possible to conveniently perform the operation, but on the basis of guarantee of the structural strength, it is preferred that the constraint rods 41 and the connecting posts 42 are two pairs, that is, the structure shown in one of FIG. 1 to FIG. 4 of the present disclosure.

Figure 6:
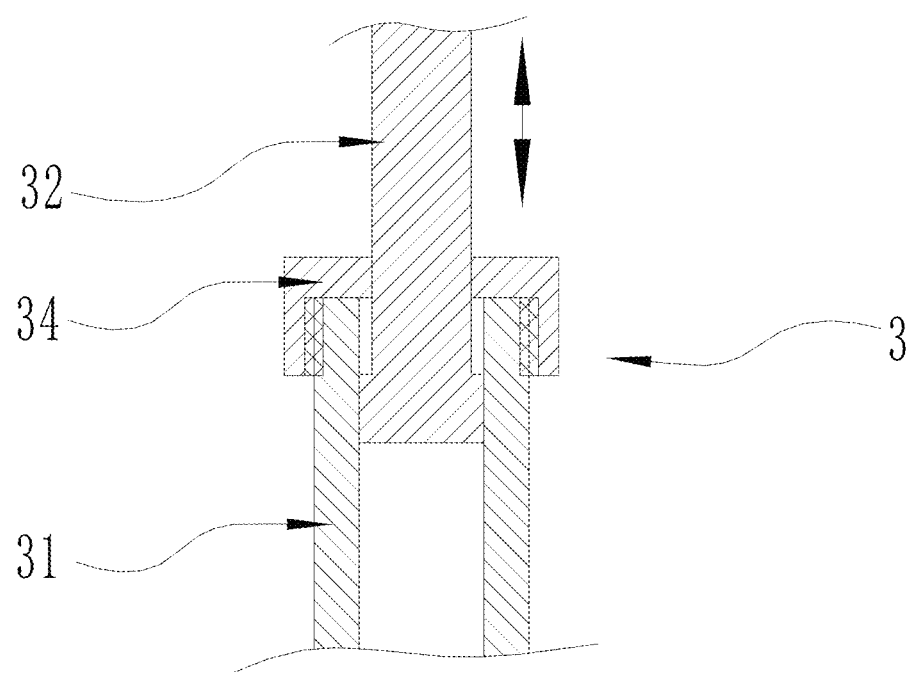
FIG. 6 shows a sectional diagram of a brief localized structure of the drag rod in accordance with Embodiment 1 of the present disclosure, in which directions of the arrows are retractable directions of the drag rod.

Referring to FIG. 6, in the embodiments of the present disclosure, to improve the use convenience of drag rod and miniaturization when it stowed in the transfer trolley, the drag rod 3 is of a split structure. Specifically, the drag rod 3 includes a first drag rod 31 and a second drag rod 32. One end of the first drag rod 31 is relatively rotationally connected to the connecting base 122 via the rotator 33 (specifically rotationally connected to one end of the second traction rods 123 that connected with the connecting base 122 and disposed between the pair of the first traction rods 121), and one end of the second drag rod 32 is slidably connected in parallel to the other end of the first drag rod 31. The anti-detachment structure 34 is provided between one end of the second drag rod 32 and the other end of the first drag rod 31 to prevent the first drag rod 31 from separating the second drag rod 32. The other end of the second rod 32 may be flipped upwardly or downwardly around the one end of the first drag rod 31 that is relatively rotationally connected with the connecting base 122. And for the selection of the lengths of the first drag rod 31 and the second drag rod 32, the second drag rod 32 can be set relatively short, and since the first drag rod 31 is rotationally connected with the connecting base 122 via the rotor 33, the position of the second drag rod 32 can be easily adjusted to a position and an angle that facilitates pulling of the transfer trolley by the angle of its rotation in combination with the amplitude of the user's pulling arm.

In the embodiments of the present disclosure, the connecting base 122 may also be set up as a single one-piece structure which is directly connected to one end of the second traction rods 123, and then the first traction rods 121 are rotationally connected with the connecting base 122.

For the choice of the casters 2, the casters 2 described in the embodiments are universal wheels, in addition to which, they can also be partly unidirectional or all unidirectional.

Additionally, in addition to the above mentioned drag rod 3 is of split structure, the drag rod 3 may also be of one-piece single rod structure. When it is the single rod structure, one end of the drag rod 3 is connected with the connecting base, and the other end of the drag rod 3 may be flipped upwardly or downwardly around the one end of the drag rod 3 that is rotationally connected with the connecting base 122.

Referring to FIG. 1, when the transfer trolley of the embodiments is in use, the drag rod 3 can be flipped out, and then the second drag rod 32 is pulled to allow it is oriented towards and located in the position and direction of the user's subsequent hand pull, and then the bracing pieces 11 are pulled to unfold the frame. During the unfolding process, since the first traction rods 121, the second traction rods 123 and the third traction rods 124 are mostly rotationally connected, when the bracing pieces 11 are pulled, they can be unfolded more easily, and after the unfolding is completed, through the rotation of the constraint rods 41 on the constraint components 4, the connecting hooks 411 are removably connected with corresponding connecting posts 42. The unfolded state of the frame 1 is locked in this manner, and the constraint rods 41 can be made of metal sheets or plastic sheets, utilizing their deformation ability within a certain thickness, so that the connecting hooks 411 and the connecting posts 42 are more tightly fitted in hooked cooperation. And when disengaged, it is easy to dismantle (or unlock) by applying a certain force. In the embodiments of the present disclosure, after the frame 1 is unfolded, the above of the bracing pieces 11 can form a support area for placing articles, so that the user can place the boxed, carton, or bagged articles which have been packaged to be transshipped directly on the support area on the frame 1.

Figure 2:
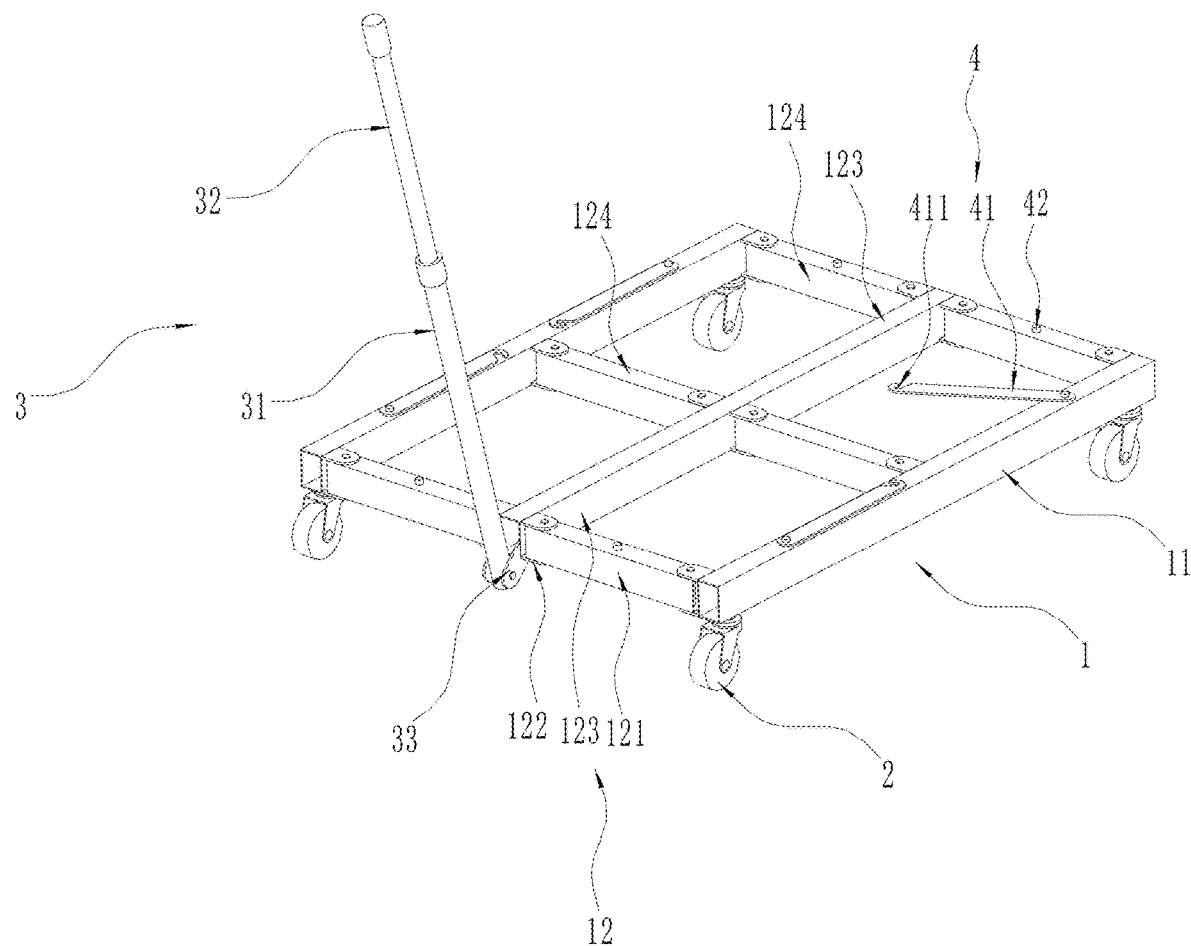
FIG. 2 shows another schematic diagram of a briefly implemented structure of the transfer trolley in accordance with Embodiment 1 of the present disclosure, illustrating that the frame of the transfer trolley in the unfolded state, and the constraint components fit with the frame in an unlocked state.
Figure 3:
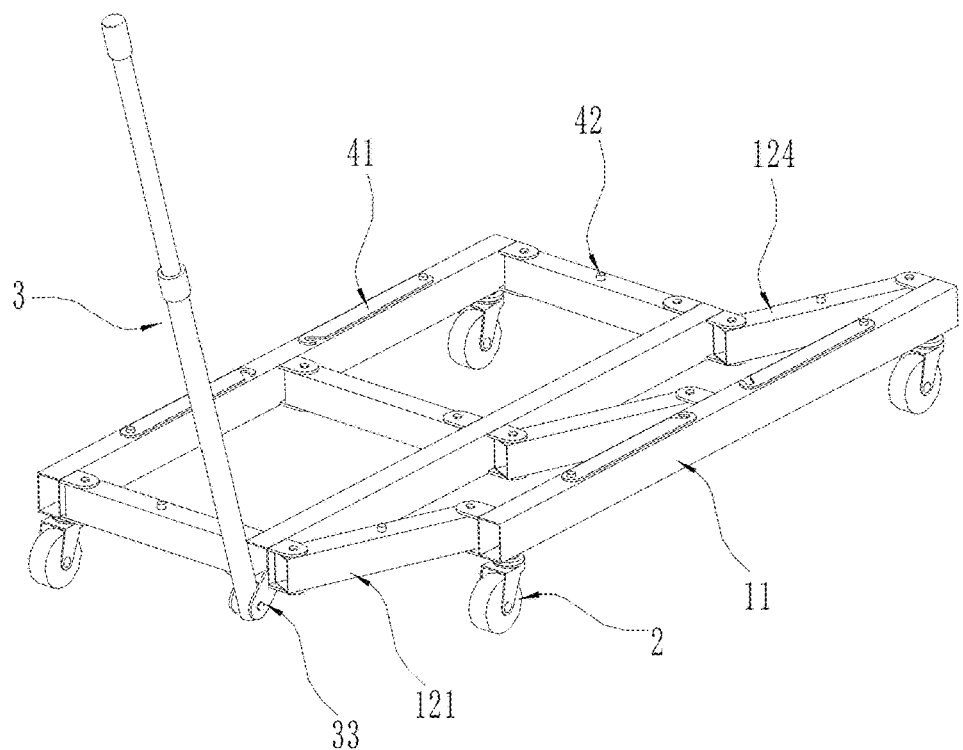
FIG. 3 shows still another schematic diagram of a briefly implemented structure of the transfer trolley in accordance with Embodiment 1 of the present disclosure, illustrating that one part of the frame of the transfer trolley in the unfolded state and the other part of the frame in the folded state.
Figure 4:
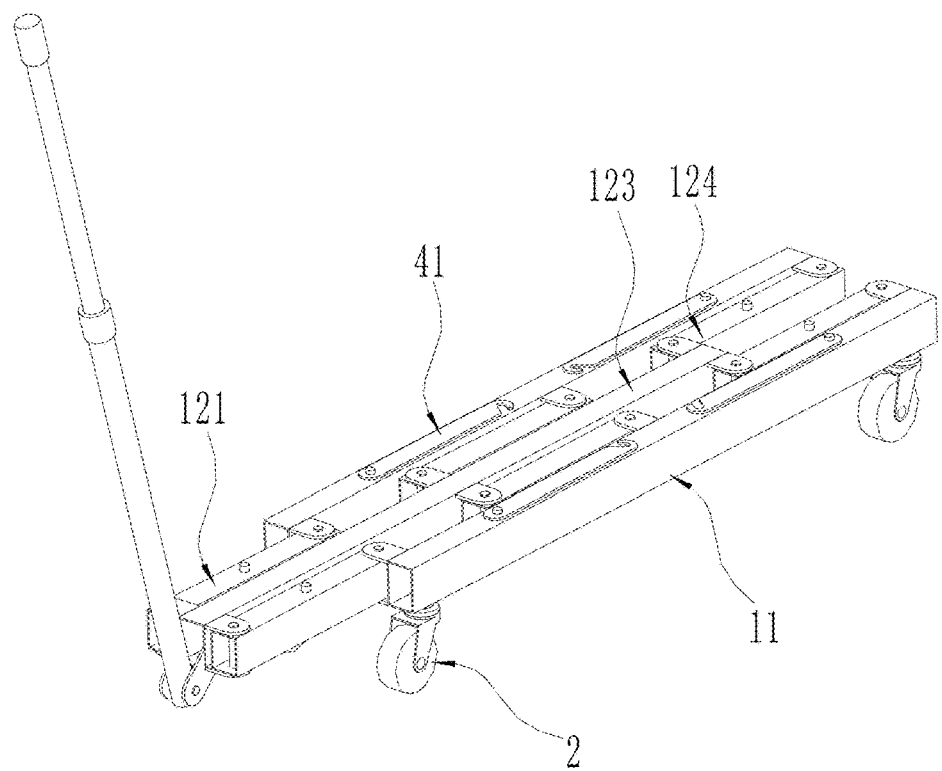
FIG. 4 shows yet another schematic diagram of a briefly implemented structure of the transfer trolley in accordance with Embodiment 1 of the present disclosure, illustrating that the frame of the transfer trolley in the folded state.
Figure 5:
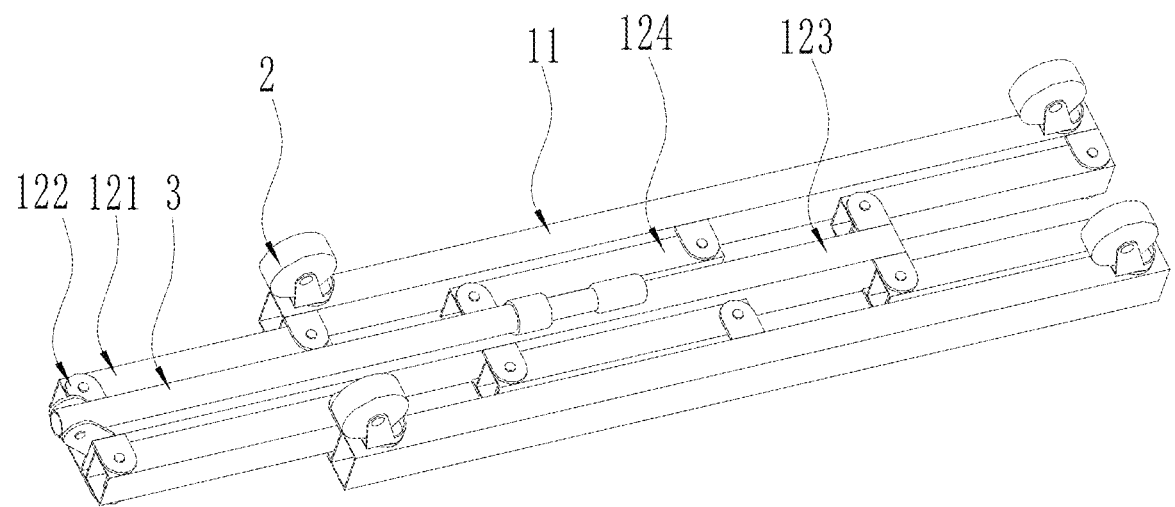
FIG. 5 shows yet another schematic diagram of a briefly implemented structure of the transfer trolley in accordance with Embodiment 1 of the present disclosure, illustrating that the frame in the folded state and a drag rod is rotated and stowed.

Referring FIG. 2 to FIG. 5, in the embodiments of the present disclosure, when the transfer trolley is not in use, the constraint rods 41 and connecting posts 42 of the constraint components 4 can be unlocked from the frame 1 for unfolding (see FIG. 2). Then from the bracing pieces 11 on both sides of the frame 1 to transfer the frame along the width direction of the frame 1 (see FIG. 3 and FIG. 4) to realize collection, and then flip the drag rod 3 (see FIG. 5) after the collection, and finally fold the transfer trolley.

Embodiment 2

Referring to FIG. 7 to FIG. 10, this embodiment is substantially the same as the Embodiment 1, but differs in that, the connective components 12 of the frame 1 differ from the Embodiment 1. In the embodiment, the pair of the bracing pieces 11 are set horizontally opposite each other in parallel, and the connecting components 12 include, a pair of first traction rods 121, corresponding with the bracing pieces 11 one to one, where one end of the first traction rods 121 is rotary connected with one end of the bracing pieces 11;

a connecting base 122, provided between the pair of the first traction rods 121, where the other end of the first traction rods 121 is rotary connected with both back-to-back sides the connecting base 122;

a pair of connecting rods 125, with a middle thereon being connected in the scissor rotation via a rotary shaft 1252, where the connecting rods 125 are disposed between the pair of the bracing pieces 11, one end of the connecting rods 125 is rotationally connected to the other end of the bracing pieces 11; and sliding guides 126, with the number of the sliding guides 126 corresponding to the number of the bracing pieces 11, and the sliding guides 126 are secured between both ends of the bracing pieces 11, the other end of the connecting rods 125 is relatively slidably connected with the sliding guides 126 by means of a sliding connector 1251, to achieve a relative movement of the frame 1 when the frame is folded or unfolded, specifically the sliding guides 126 are provided with sliding groove 1261, and the connector 1251 is slidably connected with the sliding groove 1261.

In the embodiments of the present disclosure, the fit of the constraint components 4 with the connecting components 12 is the unlocked state, and when the bracing pieces 11 of the frame 1 is moved in a similar or dissimilar direction, the other end of the connecting rods 125 moves relative to the bracing pieces 11 to allow the frame to be folded or unfolded in the width direction.

And for the implementation structure of the constraint components 4, in the embodiments of the present disclosure, the constraint components 4 is the locating part 43 having a rod-like structure, the number of the locating part 43 corresponds to the bracing pieces 11 one by one. The locating part 43 is fixed to one end of the bracing pieces 11, the locating part 43 is used to limit the rotation of the other end of the first traction rods 121 in a direction away from the other end of the bracing pieces 11 to a preset value (in this embodiment, this limiting value is a range of the first traction rods 121 flipped to be perpendicular to or form an angle of 90°±15° with the bracing pieces 11). When the other end of the first traction rods 121 is rotated in a direction away from the other end of the bracing pieces, so that the first traction rods abut against the locating part 43, the amplitude of unfolding of the frame 11 in the width direction is unidirectional locked. At this time, since the user applies a traction force through the drag rod 3, the first traction rods 121 are subjected to a force and do not rotate along the other end close to the bracing pieces 11. Therefore, it is possible to make the frame 11 remain unfolded. Furthermore, since the transfer trolley is mostly used on a flat road, when not pulling the drag rod 3, the bracing pieces 11 will also not be subject to other forces that would cause them to actively fold.

To avoid interference between the locating part 43 and the first traction rods 121 during transferring the frame 1, the first traction rods 121 have one of the following configurations or positional relationships with the locating part 43.

Figure 11:
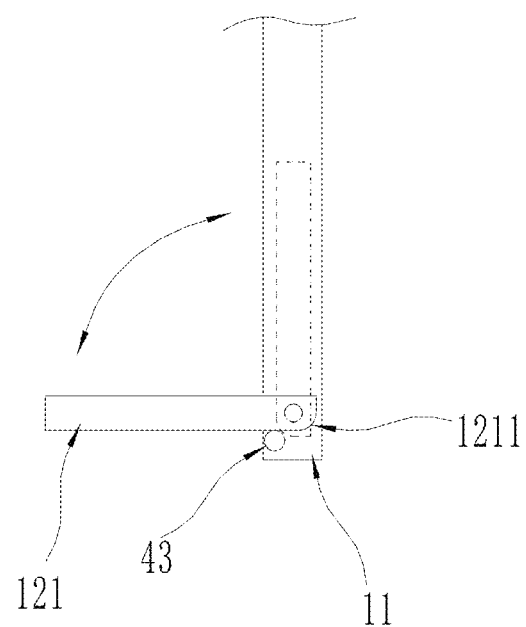
FIG. 11 shows a sectional diagram of an implemented structure and a mating state of the first traction rods and the constraint components in accordance with Embodiment 2 of the present disclosure.

(1) referring to FIG. 11, a portion of the first traction rods 121 in proximity to the limited rods 43 is provided with an avoidance structure 1211, the avoidance structure 1211 is configured to allow one end of the first traction rods 121 does not interfere in motion with the limited rods 43 in case of the other end of the first traction rods 121 is rotated in a direction proximate to the other end of the bracing pieces 11.

Figure 12:
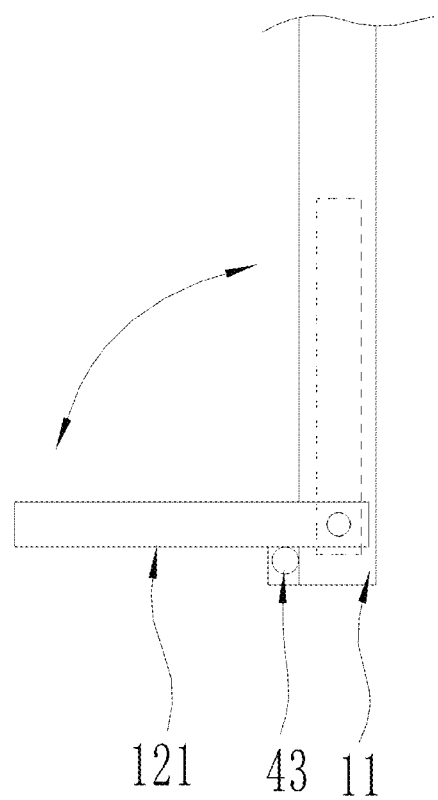
FIG. 12 shows a sectional diagram of another implemented structure and mating state of the first traction rods and the constraint components in accordance with Embodiment 2 of the present disclosure.

Referring to FIG. 12, the first traction rods 121 form a preset spacing from one end of the limited rod 43, and when the other end of the first traction rods 121 is rotated in a direction close to the other end of the second bracing pieces 11, a virtual motion trajectory of the first traction rods 121 does not cover a layout position of the locating part 43, but when the other end of the first traction rods 121 is rotated in a direction away from the first bracing pieces 11, the layout position of the locating part 43 is located on the virtual motion trajectory, so that the drag rod 3 pulls the first traction rods 121 to a preset magnitude and is unidirectional locked (or restricted) from further movement.

In the embodiments of the present disclosure, the drag rod 3 is connected with the connecting base 122 by the rotor (e.g., rotating connecting pin, connecting shaft, etc.), and the other end of the drag rod 3 may be flipped upwardly or downwardly around the one end of the drag rod 3 that is rotationally connected with the connecting base 122. And the structure of the drag rod 3 may be a one-piece single rod structure or a split double rod structure as in the Embodiment 1, which will not be described herein.

Figure 7:
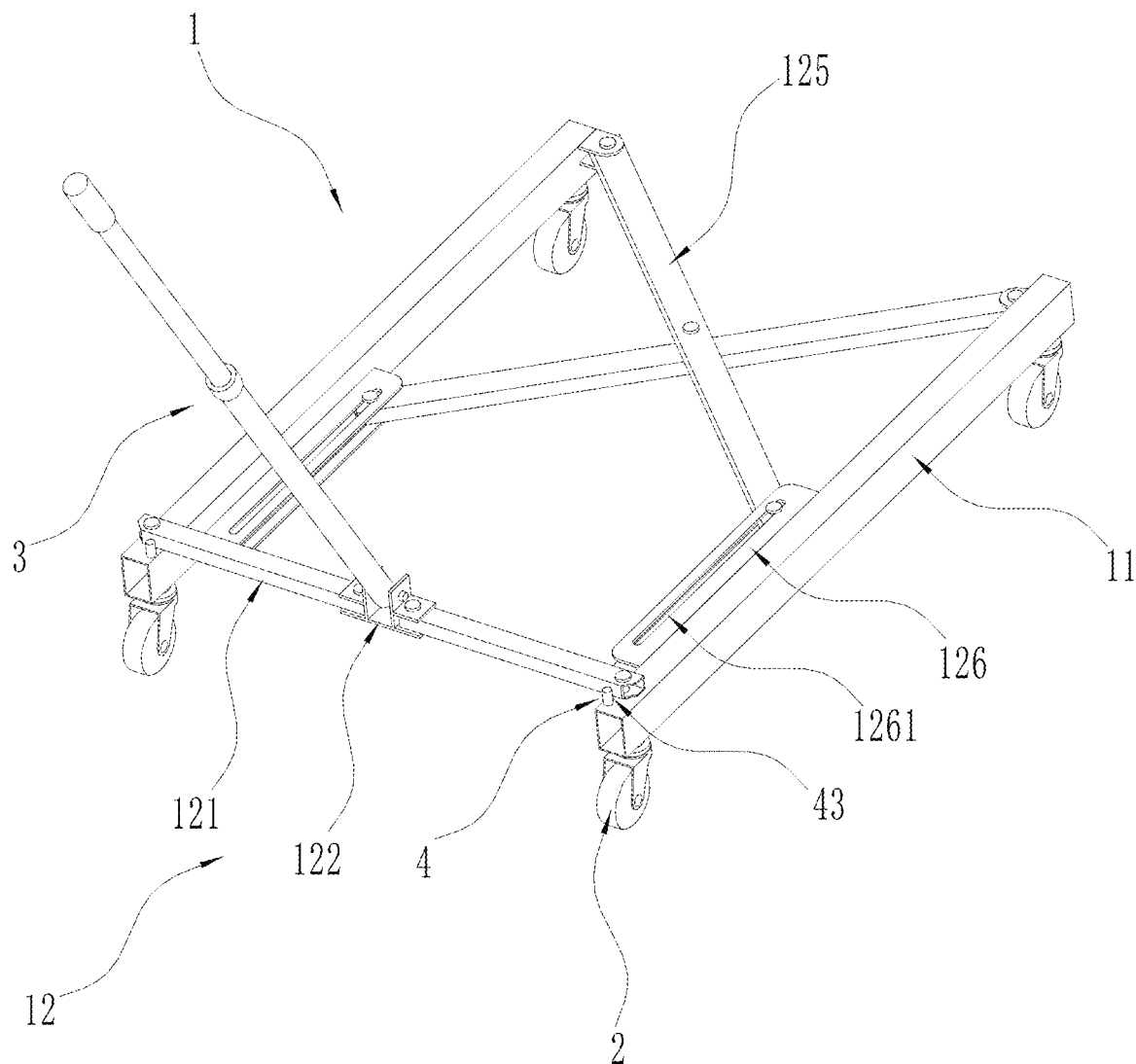
FIG. 7 shows a schematic diagram of a briefly implemented structure of a transfer trolley in accordance with Embodiment 2 of the present disclosure, illustrating that a frame of the transfer trolley in an unfolded state.

In the embodiments of the present disclosure, the state of the transfer trolley when in use is shown in FIG. 7, where the above of the bracing pieces 11 forms a support area for placing items, and the user can place the boxed, cartooned or bagged items to be transferred that have been packaged directly on the frame 1.

Figure 8:
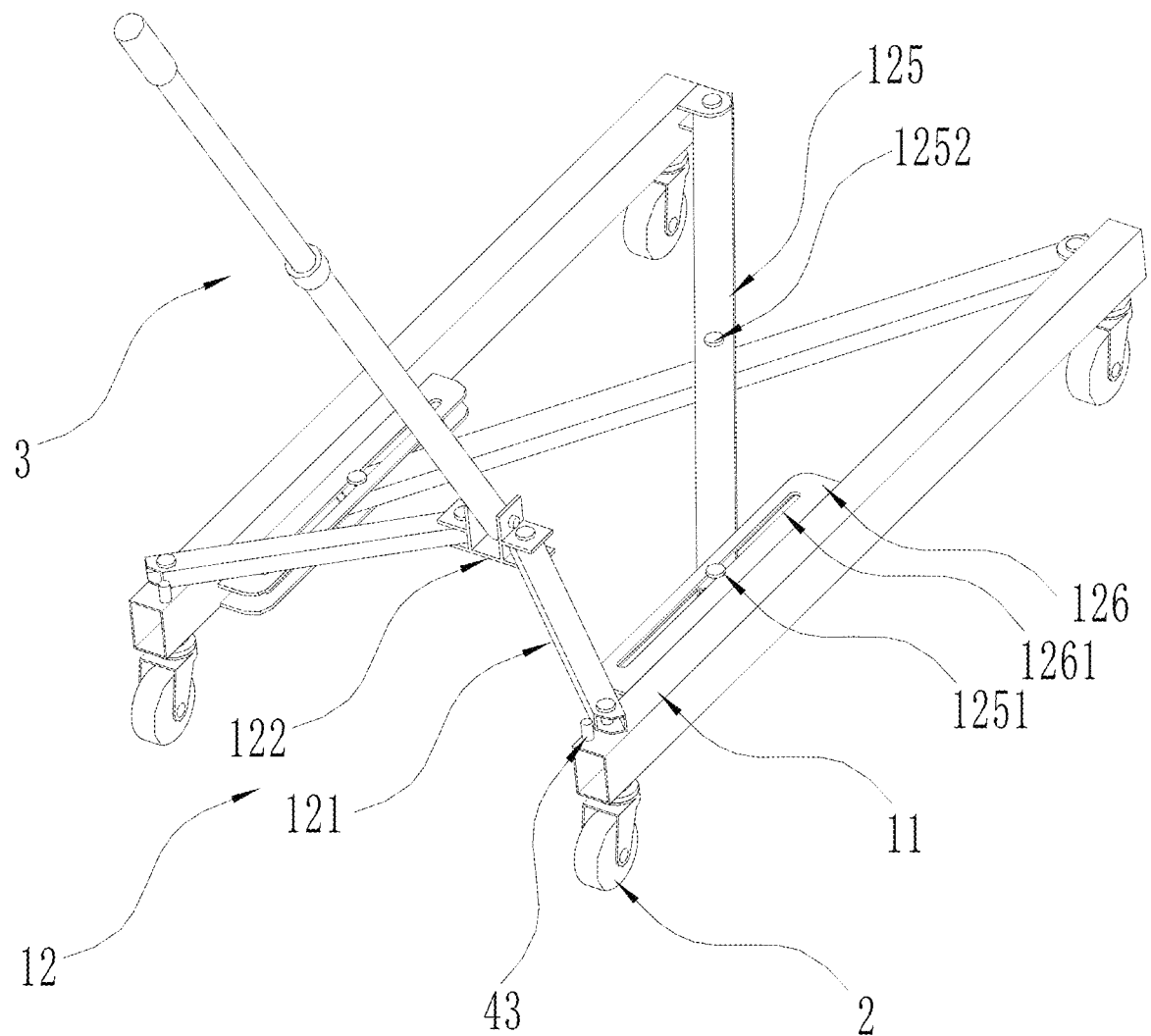
FIG. 8 shows another schematic diagram of a briefly implemented structure of the transfer trolley in accordance with Embodiment 2 of the present disclosure, illustrating that the frame of the transfer trolley in a folded state.
Figure 9:
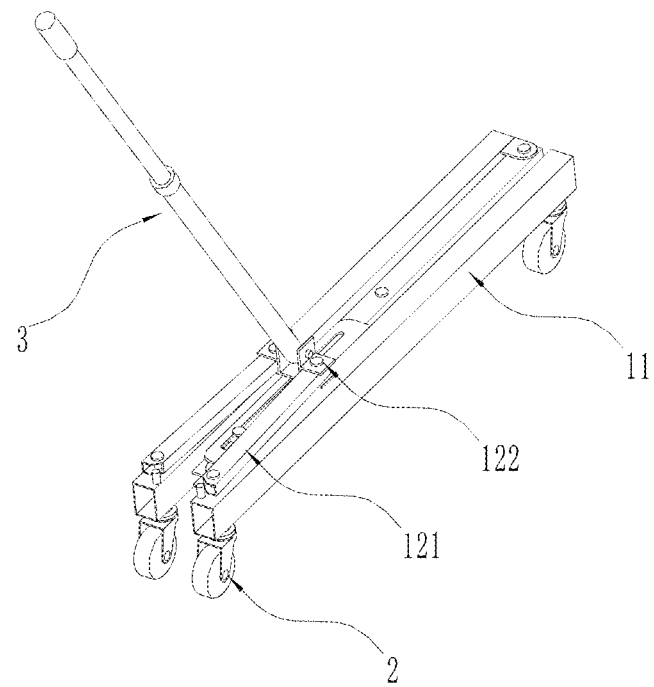
FIG. 9 shows still another schematic diagram of a briefly implemented structure of the transfer trolley in accordance with Embodiment 2 of the present disclosure, illustrating that the frame of the transfer trolley has been finished folding and the drag rod is not yet stowed.
Figure 10:
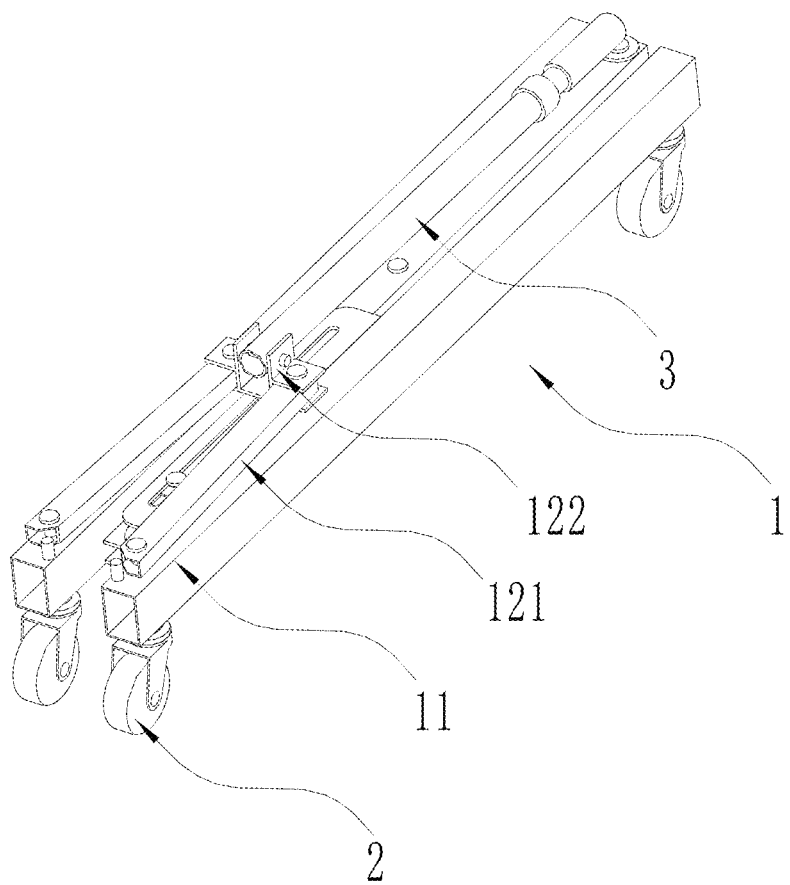
FIG. 10 shows yet another schematic diagram of a briefly implemented structure of the transfer trolley in accordance with Embodiment 2 of the present disclosure, illustrating that the transfer trolley in folded state.

Referring to FIG. 8 to FIG. 10, when the transfer not in use, the drag rod 3 may be pushed in a reverse direction, to allow the first traction rods 121 is rotated in a direction close to the other end of the bracing pieces 11, so as to bring the locating part 43 of the constraint components 4 out of the contact with the first traction rods 121. Since the transfer trolley is no longer in use at this time, the user will not continue to apply the pulling force on the drag rod 3, then the first traction rods 121 abut against the locating part 43. Instead, the first traction rods 121 are rotated along the direction close to the other end of the bracing pieces 11 by pushing back the drag rod 3, so the unfolded locked state of the frame 1 is automatically lifted (see FIG. 8). When the bracing pieces 11 and the connective components have been folded and stowed (see FIG. 9), finally the drag rod 3 is stowed and flipped (see FIG. 10), and the transfer trolley is folded.

Embodiment 3

Figure 13:
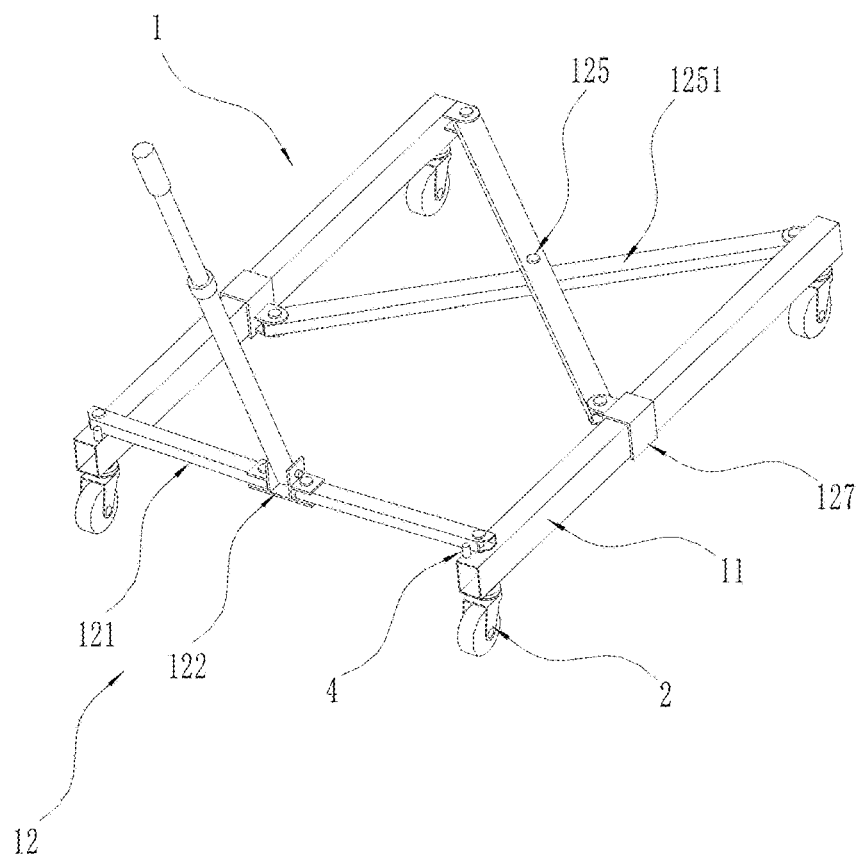
FIG. 13 shows a sectional diagram of a brief localized structure of a transfer trolley in accordance with Embodiment 3 of the present disclosure, illustrating that the frame in unfolded state.

Referring to FIG. 13, this embodiment is substantially the same as the Embodiment 2, but differs in that, in the embodiment, the connective components further include coupling sleeves 127. The number of the coupling sleeves 127 corresponding to the number of the bracing pieces 11, the coupling sleeves 127 are slidably sleeved on the bracing pieces 11 along the length direction of the bracing pieces 11, and the other end of the connecting rods 1251 are rotatably connected with the coupling sleeves 127 by a rotating connector. That is, in this embodiment, the sliding guides of the Embodiment 2 are replaced by the coupling sleeves 127. It should be noted that in the embodiments, the length direction of the bracing pieces 11 is parallel to the direction of travel of the transfer trolley.

Since the principle and operation of the use and folding of the transfer trolley in the embodiments is substantially the same as that of the Embodiment 2, it will not be described in detail, and at the same time, the other components with the same reference signs not mentioned in the embodiments are substantially the same as those of the Embodiment 2, and they will not be described in detail herein.

Embodiment 4

Figure 14:
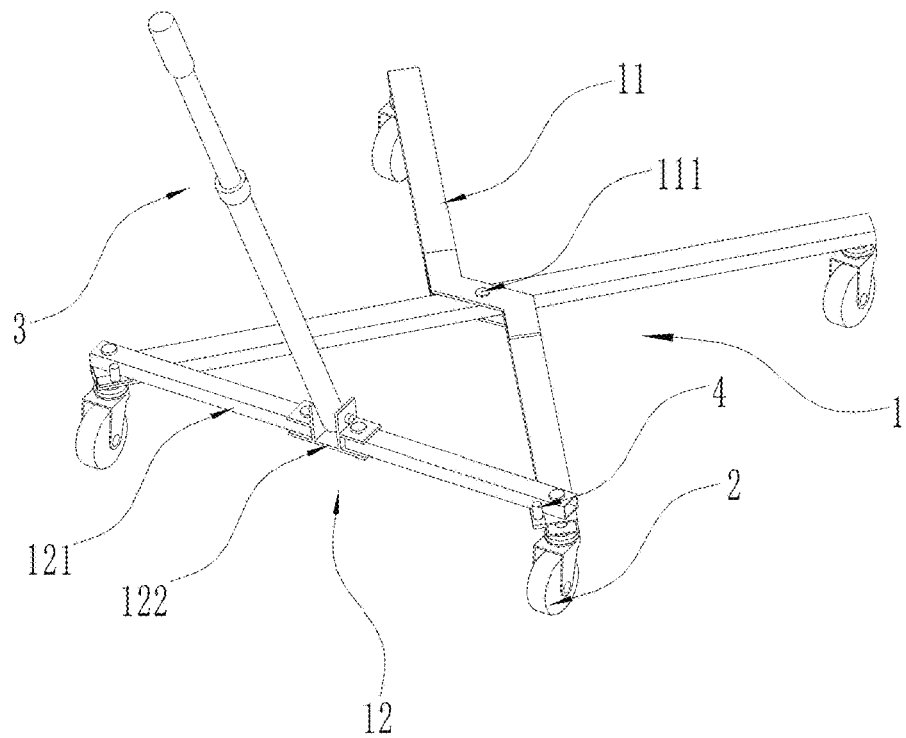
FIG. 14 shows a sectional diagram of a brief localized structure of a transfer trolley in accordance with Embodiment 4 of the present disclosure, illustrating that the frame in unfolded state.

Referring to FIG. 14, this embodiment is substantially the same as the Embodiments 2 and 3, but differs in that, in the embodiment, the pair of the bracing pieces 11 is set crosswise, the middle of the pair of the bracing pieces 11 is connected in a scissor rotation by a connecting shaft 111, in which case the connective components include:
- a pair of first traction rods 121, corresponding with the bracing pieces 11 one to one, where one end of the first traction rods 121 is rotary connected with one end of the bracing pieces 11; and
- a connecting base 122, provided between the pair of the first traction rods 121, where the other end of the first traction rods 121 is rotary connected with the connecting base 122.

Herein the one end of the drag rod 3 is connected with the connecting base 122 by means of the rotor (e.g., the rotary connecting pin, connecting shaft, etc.), and the other end of the drag rod 3 is flipped upwardly or downwardly around the one end of the drag rod 3 that is rotationally connected with the connecting base 122.

The constraint components 4 of the embodiment are the same as those of the Embodiments 2 and 3, and the principle and operation of the constraint components 4 fitting with the frame 1 for unfolding locking and unlocking are generally the same, and therefore it will not be repeated herein. And meanwhile, the other components with the same reference signs not mentioned in the embodiments are substantially the same as those of the Embodiment 2, and they will not be described in detail herein.

Embodiment 5

Figure 15:
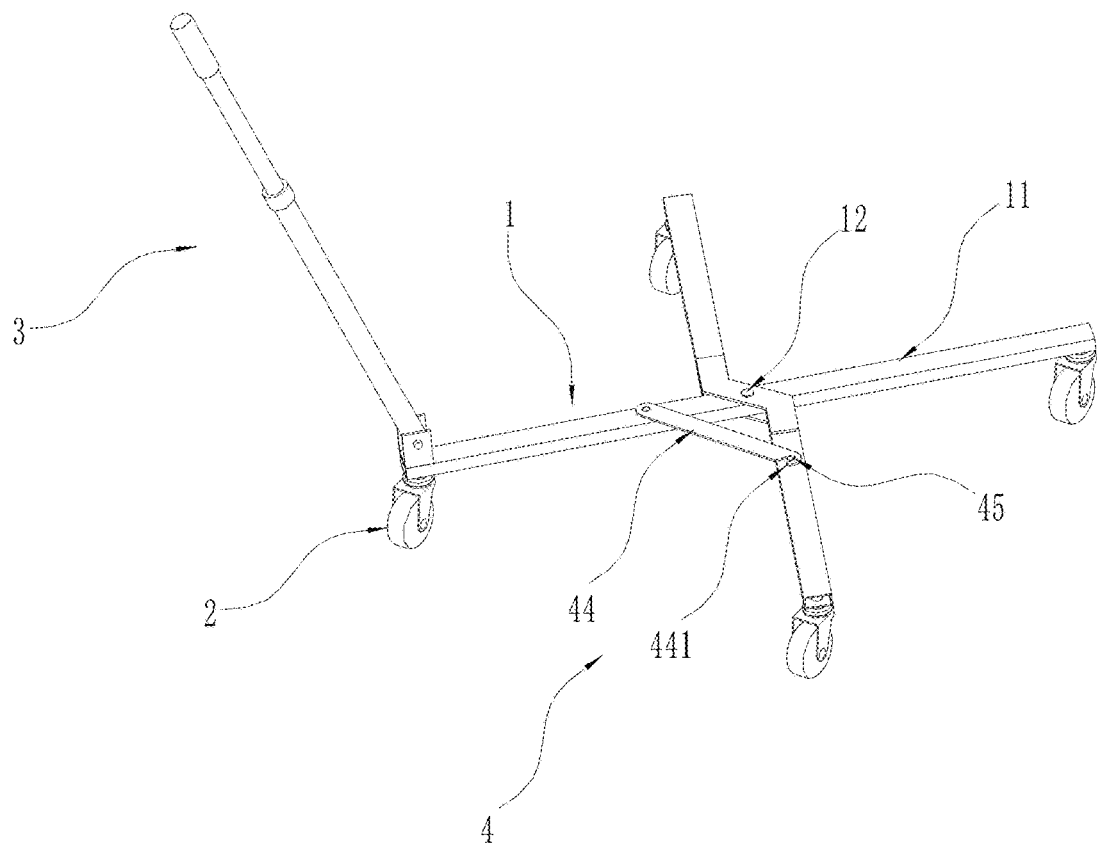
FIG. 15 shows a sectional diagram of a brief localized structure of a transfer trolley in accordance with Embodiment 5 of the present disclosure, illustrating that the frame in unfolded state.

Referring to FIG. 15, this embodiment is substantially the same as the Embodiment 4, but differs in that, in the embodiment, the constraint components 4, the connective components 12 are different from those of the Embodiment 4. In the embodiment, the pair of the bracing pieces 11 is set up crosswise, and the middle part of the bracing pieces 11 is connected in a scissor rotation by means of the connective components 12. The connective components 12 are connecting shafts, and in the embodiment, one end of the drag rod 3 is rotationally connected to one end of one of the bracing pieces 11. The casters 2 are connected to the underside of ends of the bracing pieces 11, which can be universal wheels.

On the basis of above configurations, in the embodiments of the present disclosure, the constraint components 4 include:
- a limit post 45, provided in a region from the middle of one of the bracing pieces 11 to one end thereon; and
- a lock lever 44, corresponding to the limit post 45 and rotary disposed in the area from the middle of the other bracing piece 11 to one end thereon. One end of the lock lever 44 is rotationally connected with the bracing pieces 11, and the other end of the lock lever 44 is provided with a locking hook 441. The locking hook 441 is configured to detachably connect with the limit post 45 for fitting, to allow the frame 1 formed by the bracing pieces has the locked state of keeping unfolded or the unlocked state of being folded in the width direction.

Similar to the Embodiment 1, the lock lever 44 of the embodiment may be made of a metal sheet or a thin plastic sheet, utilizing its deformability within a certain thickness, so that the locking hook 441 and the limit post 45 are more tightly fitted together in a hooked cooperation. And when disengaged, they are conveniently dismantled (or be called as unlock) by applying a certain force.

Embodiment 6

Figure 16:
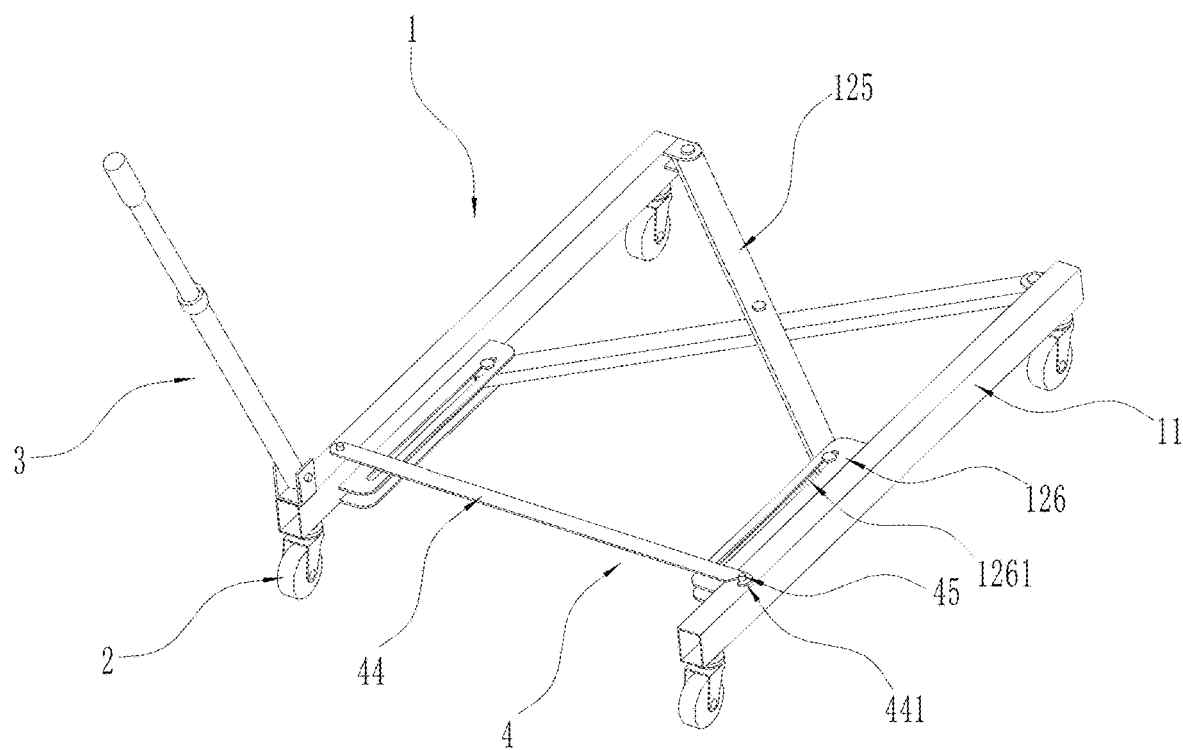
FIG. 16 shows a sectional diagram of a brief localized structure of a transfer trolley in accordance with Embodiment 6 of the present disclosure, illustrating that the frame in unfolded state.

Referring to FIG. 16, this embodiment is a partial combination of the Embodiments 2 and 5, but differs in that, in the embodiment, the pair of the bracing pieces 11 of the frame 1 is horizontally set and parallel to each other. And meanwhile, the connective components 12 are different from those of the Embodiment 5, in addition to this, in the embodiment, one end of the drag rod 3 is rotationally connected to one end of one of the bracing pieces 11, and the casters 2 are connected underneath one end of the bracing pieces 11, which may be universal casters.

On the basis of above configurations, in the embodiments of the present disclosure, the connective component 12 include:
- a pair of connecting rods 125, with a middle thereon being connected in the scissor rotation via the rotary shaft, where the connecting rods 125 are disposed between the pair of the bracing pieces 11, one end of the connecting rods is rotationally connected to the other end of the bracing pieces 11; and
- sliding guides 126, with the number of the sliding guides 126 corresponding to the number of the bracing pieces 11, and the sliding guides 126 are secured between both ends of the bracing pieces 11, the other end of the connecting rods 125 is relatively slidably connected with the sliding guides 126 by means of a sliding connector, to achieve the relative movement of the frame 1 when folded or unfolded. Specifically, the sliding guides 126 are provided with sliding grooves 1261, and the sliding connector is slidingly connected to the sliding grooves 1261.

In the embodiments of the present disclosure, the constraint components 4 include:

a limit post 45, provided in the area from the middle of one of the bracing pieces 11 to one end thereon; and a lock lever 44, corresponding to the limit post 45 and rotatably provided in the area from the middle of the other of the bracing pieces 11 to one end thereon; one end of the lock lever 44 is rotatably connected with the bracing pieces 11, and the other end of the lock lever 44 is provided with a locking hook 441; the locking hook 441 is configured to removably connect with the limit post 45 for fitting, to allow the frame 1 formed by the bracing pieces has the locked state of keeping unfolded or the unlocked state of being folded in the width direction.

Similar to the Embodiment 1, the lock lever 44 of the embodiment may be made of a metal sheet or a thin plastic sheet, utilizing its deformability within a certain thickness, so that the locking hook 441 and the limit post 45 are more tightly fitted together in a hooked cooperation. And when disengaged, they are conveniently dismantled (or be called as unlock) by applying a certain force.

Embodiment 7

Figure 17:
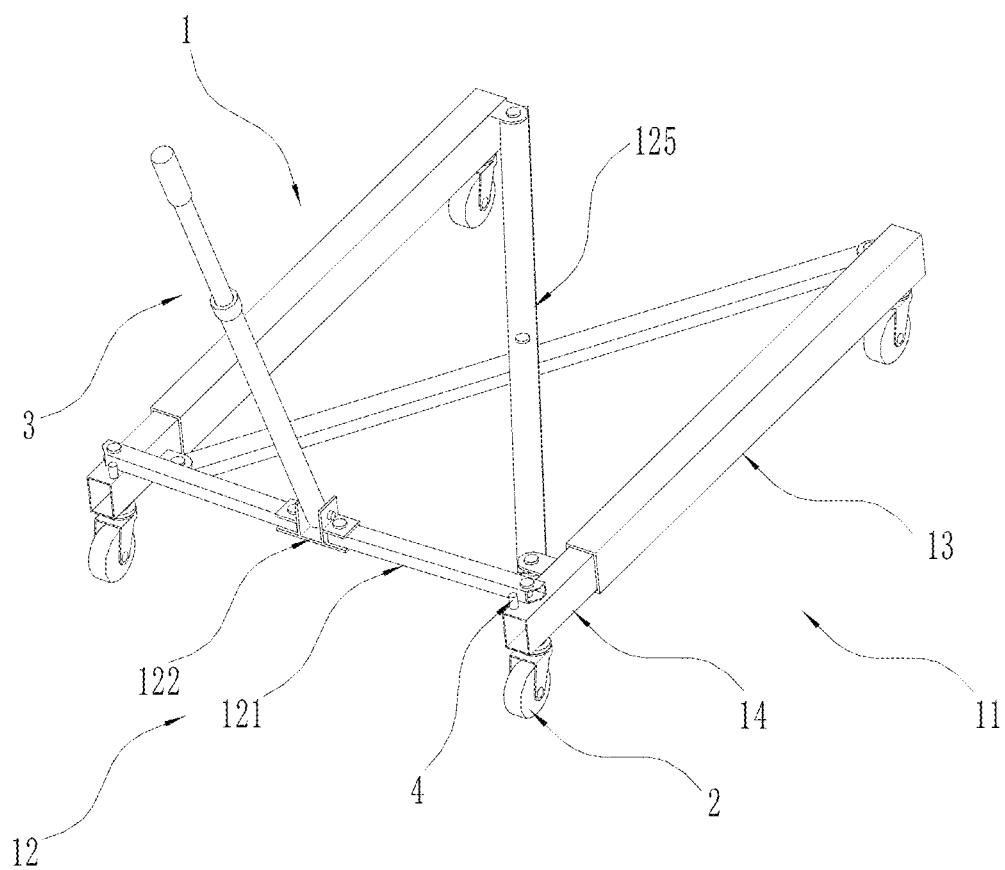
FIG. 17 shows a sectional diagram of a brief localized structure of a transfer trolley in accordance with Embodiment 7 of the present disclosure, illustrating that the frame in unfolded state.

Referring to FIG. 17, this embodiment is substantially the same as the Embodiments 2 and 3, but differs in that, in the embodiment, the bracing pieces 11 include:

a pair of first bracing pieces 13, horizontally arranged and parallel to each other; and a pair of second bracing pieces 14, corresponding to the first bracing pieces 13 and one end of the second bracing pieces 14 is slidably sleeved on one end of the first bracing pieces 13.

Herein the first connecting rods 121 are one-to-one with the second bracing pieces 14, and one end of the first traction rods 121 is rotationally connected to the other end of the second bracing pieces 14.

Herein one end of the first connecting rods 125 is rotationally connected to the other end of the first bracing pieces 13, and the other end of the first connecting rods 125 is rotationally connected to the other end of the second bracing pieces 14 via the connector.

On the basis of this configuration form, when the bracing pieces 11 are unfolded or collapsed, because the second bracing pieces 14 is able to slide relative to the first bracing pieces 13, it is possible to cause the pair of the connecting rods 125 to oscillate crosswise, thus cooperating with the frame 11 of unfolding or folding.

The constraint components 4 of the embodiment are approximately the same as those of the Embodiments 2 and 3, and the principle and operation of the constraint components 4 fitting with the frame 1 for unfolding locking and unlocking are generally the same, and therefore it will not be repeated herein. And meanwhile, the other components with the same reference signs not mentioned in the embodiments are approximately the same as those of the Embodiment 2, and they will not be described in detail herein.

The foregoing is only a part of the embodiments of the present disclosure, but not limited the scope of protection of the present disclosure. Any equivalent device or equivalent process transformation utilizing the contents of the specification of the present disclosure and the accompanying drawings, or directly or indirectly be applied in other related technical fields, shall be included in the scope of protection of the present invention.

What is claimed is:

1. A transfer trolley, comprising:
   a frame, having a structure of being folded or unfolded in a width direction;
   casters, fixed to bottom of the frame;
   a drag rod, one end of the drag rod being rotary fixed to one end in a length direction of the frame, and the other end of the drag rod being flipped upwardly or downwardly around the one end of the drag rod that is rotationally connected with the frame; and
   constraint components, fixed to and cooperating with the frame to allow the frame in a locked state of keeping unfolded or an unlocked state of being folded in the width direction;
   wherein the frame comprises:
       a pair of bracing pieces, arranged opposite each other, wherein the casters are two pairs and two casters opposite each other are fixed to lower parts of both ends of the bracing pieces; and
       connective components, connected to the bracing pieces and capable of moving the bracing pieces to fold or unfold the frame along the width direction; and
   wherein one end of the bracing pieces is rotary connected to one end of the connective components or one of the bracing pieces, the constraint components are connected with the bracing pieces and cooperate with the connective components to allow the frame in the locked state of keeping unfolded or the unlocked state of being folded in the width direction;
   wherein the pair of bracing pieces extend horizontally and are arranged parallel to each other or crosswise, and in case of the bracing pieces are arranged crosswise, middle of the bracing pieces is connected by a connecting shaft in a scissor rotation, and the connective components comprises,
   a pair of first traction rods, corresponding with the bracing pieces one to one, wherein one end of the first traction rods is rotary connected with one end of the bracing pieces; and
   a connecting base, provided between the pair of the first traction rods, wherein the other end of the first traction rods is rotary connected with the connecting base; and
   wherein one end of the drag rod is connected with the connecting base by means of a rotor, and the other end of the drag rod is flipped upwardly or downwardly around the one end of the drag rod that is rotationally connected with the connecting base.

2. The transfer trolley according to claim 1, wherein the pair of the bracing pieces extends horizontally and is arranged parallel to each other, and the connective components comprises,
   a pair of connecting rods, with a middle thereon being connected in the scissor rotation, wherein the connecting rods are disposed between the pair of the bracing pieces, one end of the connecting rods is rotationally connected to the other end of the bracing pieces, and the other end of the connecting rods is relatively movably connected to a portion between both ends of the bracing pieces by means of a connector, respectively; and
   wherein the constraint components is configured to cooperate with the connective components in the unlocked state, and in case of the bracing pieces on the frame are moved in a similar or dissimilar direction, the other end of the connecting rods is moved relative to the bracing pieces to allow the frame to be folded or unfolded in the width direction.

3. The transfer trolley according to claim 2, wherein the connective components further comprise coupling sleeves, with the number of the coupling sleeves corresponding to the number of the bracing pieces, the coupling sleeves are slidably sleeved on the bracing pieces along the length direction of the bracing pieces, and the other end of the connecting rods are rotatably connected with the coupling sleeves by a rotating connector.

4. The transfer trolley according to claim 2, wherein the connective components further comprise sliding guides, with the number of the sliding guides corresponding to the number of the bracing pieces, and the sliding guides are secured between both ends of the bracing pieces, the other end of the connecting rods is relatively slidably connected with the sliding guides by means of a sliding connector.

5. The transfer trolley according to claim 2, wherein the constraint components comprise locating parts, with the number of the locating part corresponding to the number of the bracing pieces, and the locating parts are secured on one end of the bracing pieces;
  wherein locating part is configured to limit an amplitude of rotation of the other end of the first traction rods in a direction away from the other end of the bracing pieces to a preset value, in case of the other end of the first traction rods is rotated in the direction away from the other end of the bracing pieces to allow the first traction rods abut against the locating part, the magnitude of unfolding of the frame to be performed in the width direction is unidirectional locked;
  wherein the first traction rods have one of following configurations or positional relationships with the locating part:
    a portion of the first traction rods in proximity to the locating part is provided with an avoidance structure, and the avoidance structure is configured to allow one end of the first traction rods does not interfere in motion with the locating part in case of the other end of the first traction rods is rotated in a direction proximate to the other end of the bracing pieces; and
    the first traction rods form a preset spacing from one end of the locating part, in case of the other end of the first traction rods is rotated in a direction close to the other end of the bracing pieces, a virtual motion trajectory of the first traction rods does not cover a layout position of the locating part; but in case of the other end of the first traction rods is rotated in a direction away from the other end of the bracing pieces, the layout position of the locating part is located on the virtual motion trajectory of the first traction rods.

6. The transfer trolley according to claim 2, wherein bracing pieces comprise:
  a pair of first bracing pieces, horizontally arranged and parallel to each other; and
  a pair of second bracing pieces, corresponding to the first bracing pieces and one end of the second bracing pieces is slidably sleeved on one end of the first bracing pieces;
  wherein the first connecting rods are one-to-one with the second bracing pieces, and one end of the first traction rods is rotationally connected to the other end of the second bracing pieces;
  wherein one end of the first connecting rods is rotationally connected to the other end of the first bracing pieces, and the other end of the first connecting rods is rotationally connected to the other end of the second bracing pieces via the connector;
  wherein the constraint components comprise a pair of limited rods, the locating part is secured to the other end of the second bracing pieces, and the limited rods is configured to limit the amplitude of rotation of the other end of the first traction rods in a direction away from the other end of the second bracing pieces to a preset value, in case of the other end of the first traction rods is rotated in the direction away from the other end of the second bracing pieces to allow the first traction rods abut against the locating part, the amplitude unfolding of the frame to be performed in the width direction is unidirectional locked;
  wherein the first traction rods have following configurations or positional relationships with the limited rods:
    a portion of the first traction rods in proximity to the limited rods is provided with an avoidance structure, the avoidance structure is configured to allow one end of the first traction rods does not interfere in motion with the limited rods in case of the other end of the first traction rods is rotated in a direction proximate to the other end of the second bracing pieces; and
  the first traction rods form a preset spacing from one end of the limited rod, and in case of the other end of the first traction rods is rotated in a direction close to the other end of the second bracing pieces, a virtual motion trajectory of the first traction rods does not cover a layout position of the limited rods, but in case of the other end of the first traction rods is rotated in a direction away from the second bracing pieces, the layout position of the limited rods is located on the virtual motion trajectory.

7. The transfer trolley according to claim 1, wherein the connective components further comprise,
  a second traction rod, disposed between and parallel to the pair of the bracing pieces, wherein one end of the second traction rod extending between the pair of the first traction rods, the connecting base is provided in one pair and the pair of connecting bases are connected opposite to both sides of one end of the second traction rod, and the pair of the connecting bases are rotationally connected to the other end of the first traction rods; and
  two pairs of third traction rods, each pair oppositely disposed at the other end and middle of the second traction rod respectively, wherein one end of the third traction rods is rotationally connected with the second traction rod, and the other end of the third traction rods is rotationally connected with the bracing pieces in close proximity thereto; and
  wherein the constraint component comprises,
  at least one pair of connecting posts, relatively connected to the first traction rods and the third traction rods located between ends of the bracing pieces; and
  at least one pair of constraint rods, relatively connected to one end and the other end of the bracing pieces, wherein one end of the constraint rods is rotationally connected to one end or the other end of the bracing pieces, and the other end of the constraint rods is provided with connecting hooks, the connecting hooks is configured to removably fit with the connecting posts on the first traction rods or the third traction rods, to allow the frame has the locked state of keeping unfolded or the unlocked state of being folded in the width direction.

8. An outdoor transfer device, comprising the transfer trolley of claim 1;
- wherein the casters are universal or unidirectional wheels; and
- wherein the drag rod comprises a first drag rod and a second drag rod, one end of the first drag rod is connected with the connecting base via the rotor, and one end of the second drag rod is slidably connected in parallel to the other end of the first drag rod;
- wherein an anti-detachment structure is provided between of the one end of the second drag rod and the other end of the first drag rod to prevent the first drag rod and the second drag rod from separating; and
- wherein the other end of the second drag rod is flipped upwardly or downwardly around a rotating connection end between the first drag rod and the connecting base.

* * * * *